United States Patent [19]

Conn

[11] Patent Number: 4,813,630
[45] Date of Patent: Mar. 21, 1989

[54] ELECTRICALLY NON-CONDUCTIVE SUSPENSION CABLES FOR HOT AIR BALLOONS

[76] Inventor: Sidney H. Conn, 139 N. Mulberry St., Statesville, N.C. 28677

[21] Appl. No.: 85,169

[22] Filed: Aug. 14, 1987

[51] Int. Cl.$^4$ ................................................ B64B 1/40
[52] U.S. Cl. ...................................... 244/31; 244/127
[58] Field of Search ....................... 244/31, 127; 87/6; 57/230, 231; 24/115 K, 129 K, 131 R

[56] References Cited

U.S. PATENT DOCUMENTS

| | | | |
|---|---|---|---|
| 1,081,735 | 12/1913 | Gilmartin | 24/115 K |
| 3,229,932 | 1/1966 | Yost | 244/31 |
| 4,010,569 | 3/1977 | Finley | 24/115 K |
| 4,022,010 | 5/1977 | Gladenbeck | 57/231 |
| 4,084,065 | 4/1978 | Swenson | 87/6 |
| 4,412,474 | 11/1983 | Hara | 87/6 |
| 4,534,262 | 8/1985 | Swenson | 57/230 |
| 4,619,422 | 10/1986 | Petrehn | 244/127 |
| 4,640,179 | 2/1987 | Cameron | 87/6 |

FOREIGN PATENT DOCUMENTS 647487  2/1979  U.S.S.R. ............................. 24/115 K

OTHER PUBLICATIONS

Aerostat-Publication dated 2/1/88-Journal of the British Balloon and Airship Club.

Primary Examiner—Galen Barefoot
Attorney, Agent, or Firm—W. Thad Adams, III

[57] ABSTRACT

A suspension cable for connecting together the carriage support ropes and the envelope load cords of a hot air balloon in the area of the burner assembly. The suspension cable comprises a non-electrically conductive material having a destruct point sufficiently high to avoid damage from the accidental exposure to the flame of the burner and a tensil strength sufficient to support the balloon carriage. The suspension cable is braided and the non-conductive material comprises an aramid fiber core. The suspension cable includes a non-electrically conductive sheath surrounding the core which will destruct if accidentally exposed to the flame of the burner in order to give an indication that the suspension cable should be inspected.

39 Claims, 3 Drawing Sheets

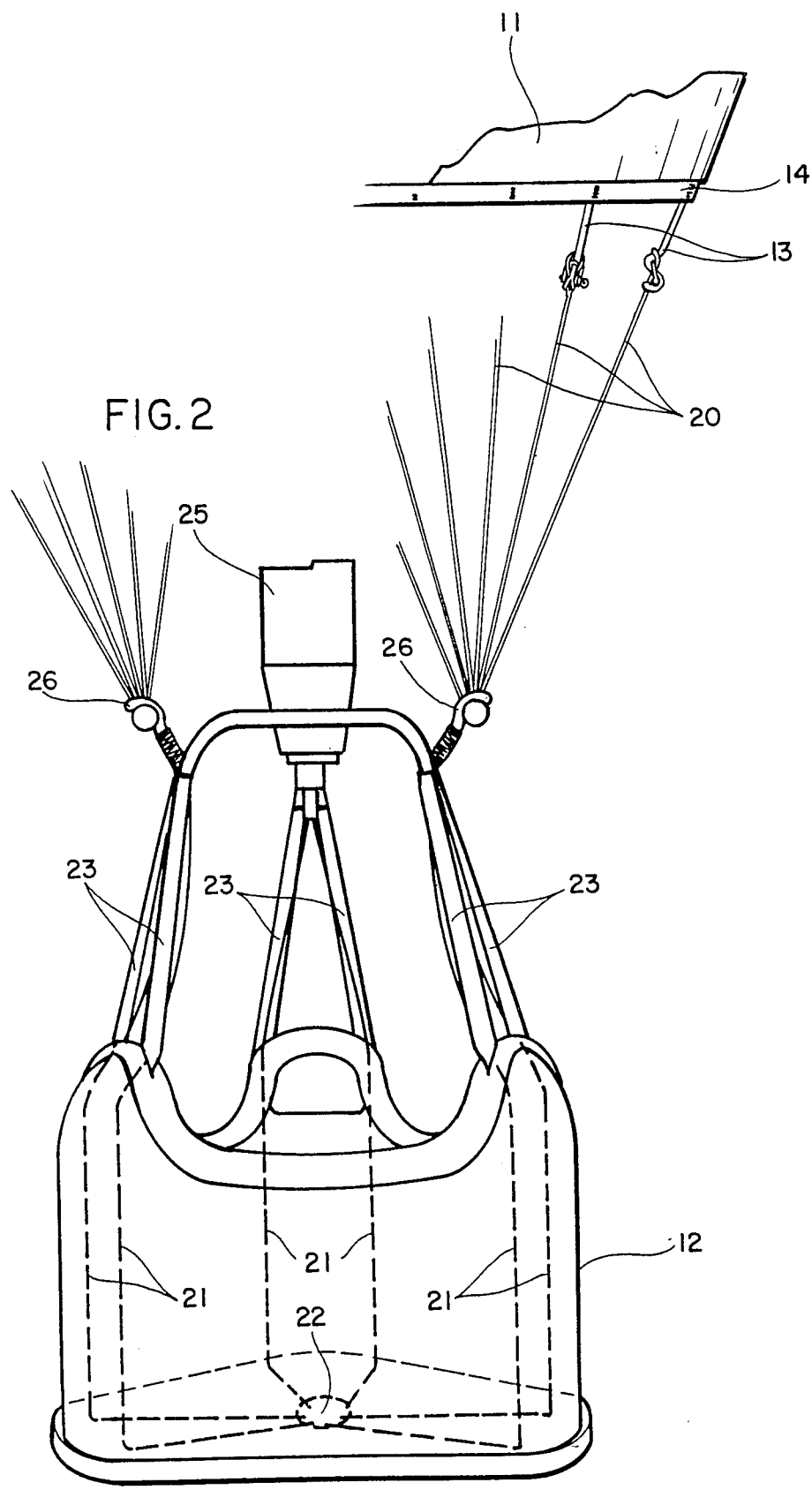

ELECTRICALLY NON-CONDUCTIVE SUSPENSION CABLES FOR HOT AIR BALLOONS

TECHNICAL FIELD AND BACKGROUND OF THE INVENTION

This invention relates to an electrically non-conductive suspension cable for a hot air, passenger-carrying balloon. The suspension cable is that portion of the balloon envelope suspension system which connects the balloon envelope and the balloon carriage in the area of the burner. Because of the intense flame of the burner, the suspension cables are required by Federal Regulation to meet certain standards intendes to insure that an accidental blast from the burner does not destroy the integrity of the suspension system. This involves the ability of the cables in the area of the burner to withstand certain temperatures for certain periods of time without structural damage. In addition, any damage which does occur must be visible so repair or replacement can be made before the balloon is used again. In addition, the suspension cables must meet stringent strength requirements.

Heretofore, stainless steel cables were the only cables capable of meeting all of these requirements. However, stainless steel, and in the fact most metals, have one significant disadvantage of particular concern to balloon pilots and passengers—it is very electrically conductive. One of the hazards of landing a balloon is inadvertent contact with electrical power lines.

Contact between the occupants and stainless steel suspension cables can cause serious injury or death. Yet, because of the other requirements of strength, resistance to damage from high heat, etc., stainless steel has nevertheless provided the only practical means of complying with Federal Aviation Regulation 31. Although some early balloons used hemp rope for suspension cables because hemp is only mildly conductive, FAA strength requirements have made it impractical for modern use.

Up until recently, when high technology engineered plastics became available, it was not possible or practical to use electrically non-conductive suspension cables. Synthetic materials such as nylon and polyester are non-conductive but have low melting temperatures (approx. 492° F. (255° C.)). In addition, the required tensile strengths are not present except in such heavy ropes that weight considerations prevent their use. Glass compounds and fiberglass have been available for years, but are fragile and brittle. Some synthetic fibers such as Nomex brand aramid fiber have the required high temperature characteristics but have low abrasion and strength properties.

Through research and testing are required by the Federal Aviation Administration, a sheathed cable of aramid fiber of the particular type known under the brand name of Kevlar has been developed and approved for use as hot air balloon suspension cables.

SUMMARY OF THE INVENTION

Therefore, it is an object of the invention to provide a suspension cable for a hot air balloon which is electrically non-conductive and otherwise meets all Federal Aviation Regulations for such cables.

It is another object of the invention to provide a suspension cable which will reveal instances when inadvertent contact with the burner flame requires inspection and repair or replacement.

It is another object of the invention to provide a suspension cable which includes protection to the cable against abrasion and ultraviolet light.

It is another object of the invention to provide a suspension cable which will replace stainless steel suspension cables on hot air balloons.

It is another object of the invention to provide a bi-component suspension cable which complies with Federal Aviation Regulations.

These and other objects of the present invention are achieved in the preferred embodiments disclosed below by providing a suspension cable for connecting together the carriage support ropes and the envelope load cords or tapes of a hot air balloon in the area of the burner assembly, the suspension cable comprising a non-electrically conductive material having a destruct point sufficiently high to avoid damage from the accidental exposure to the flame of the burner and a tensile strength sufficient to support the balloon carriage.

Preferably, the suspension cable is braided and the non-conductive material comprises an aramid fiber core. The suspension cable includes a non-electrically conductive sheath surrounding the core which will destruct if accidentally exposed to the flame of the burner in order to give an indication that the suspension cable should be inspected.

According to one preferred embodiment of the invention, the sheath is constructed of a material which provides abrasion and ultraviolet light protection to the aramid fiber core and is also non-electrically conductive.

Preferably, the sheath comprises polyester material having a melting point of approximately 492° F. (255° C.).

According to one preferred embodiment of the invention, the suspension cable has a destruct point of 900° F. (482° C.) and the aramid fiber core and the polyester are both braided.

According to another preferred embodiment of the invention, a suspension cable assembly is disclosed for connecting together the carriage support ropes and the envelope load cords or tapes of a hot air balloon in the area of the burner assembly. The suspension cable assembly comprises a non-electrically conductive material having a destruct point sufficiently high to avoid damage from the accidental exposure to the flame of the burner and a tensile strength sufficient to support the balloon. An eye splice is formed on one end of the suspension cable for mating interconnection with an eye splice on one end of the respective load cord. A shackle is intertwined between the eye splice of the suspension cable and the eye splice of the load cord to maintain a close connection between the two and to provide an enlarged bend radii to the material to prevent material breakage from sharp bending.

According to yet another embodiment of the invention, a hot air balloon including a carriage and a burner assembly suspended from an envelope by means of load cords in the envelope connecting with suspension cables in the area of the burner, which are in turn connected with carriage ropes is provided. The suspension cables comprise a non-electrically conductive material having a destruct point sufficiently high to avoid damage from the accidental exposure to the flame of the burner and a tensile strength sufficient to support the balloon.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 2 is an enlarged, fragmentary close-up of the carriage and suspension system of the balloon;

DESCRIPTION OF THE PREFERRED EMBODIMENT

Figure 1:
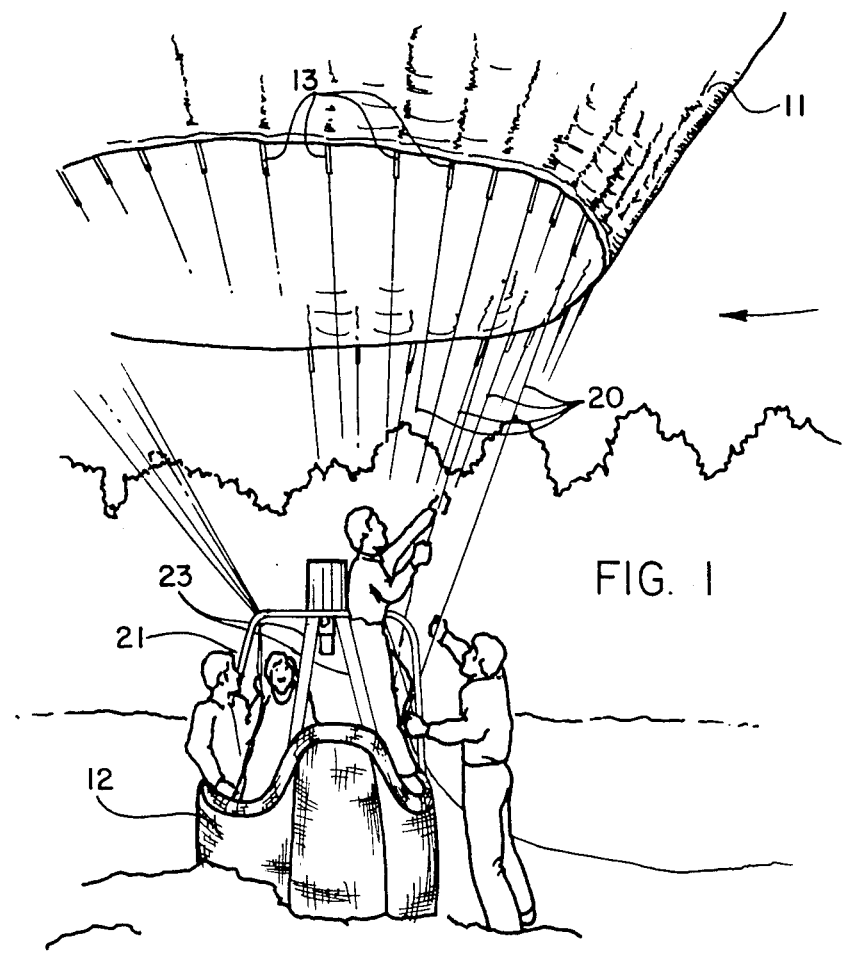
FIG. 1 is a fragmentary perspective view of a hot air balloon.

Referring now specifically to the drawings, a hot air balloon of the type to which the invention relates is illustrated in FIG. 1 and shown generally at reference numeral 10. The balloon includes a large envelope 11 into which heated air is directed. The envelope is connected to a carriage 12 by a plurality (for example, 18) of load cord or tapes 13 which extend through elongate load cord pockets (not shown) in the envelope 11. As is more clearly shown in FIG. 2, the load cords 13 terminate a short distance below the lower girdle 14 of envelope 11. The suspension cables 20 according to the present invention interconnect the ends of the load cords 13 and the carriage suspension ropes 21. Carriage suspension ropes 21 are connected to a tie plate 22 attached to the bottom of the carriage 12. The carriage suspension ropes 21 extend along the bottom and up the sides of the carriage 12 onto burner supports 23. Burner supports 23 mount a burner 25 which heats air which is then directed into the envelope 11.

The carriage suspension ropes 21 are formed into three eye splices 26 (two shown in FIG. 2). These eye splices 26 interface with the suspension cables 20.

Figure 3:
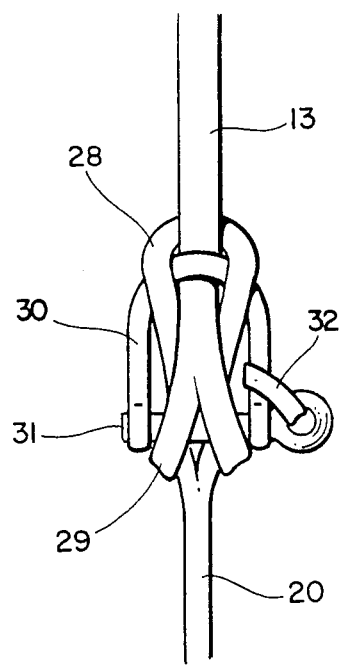
FIG. 3 is a front view of the suspension cable/load cord interface.
Figure 4:
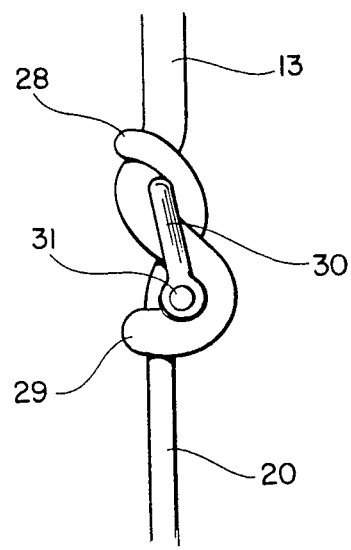
FIG. 4 is a view 90° to that in FIG. 3.

As is best shown by reference to FIGS. 3 and 4, suspension cables 20 connect to load cords 13 by means of interfaced eye splices 28 and 29, respectively. A "D" shackle 30 keeps the two eye splices 28, 29 married and under minimum stress. This arrangement keeps the bend radii at the interface relatively large, since aramid fibers will break if bent too sharply. Shackle 30 is closed by a threaded pin 31 and a plastic locking cord 32 keeps the pin from unscrewing, but permits easy removal without a wrench by simply cutting the cord 32.

Figure 5:
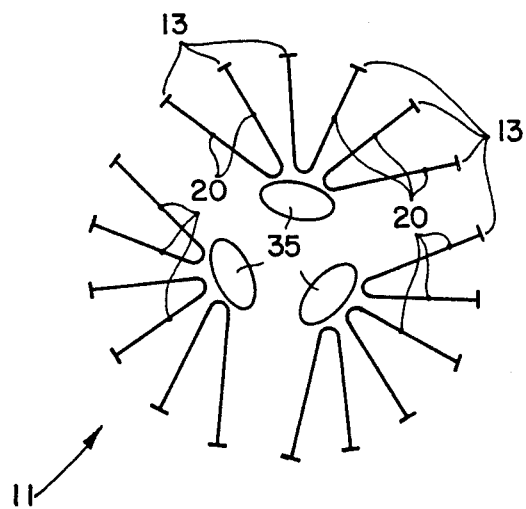
FIG. 5 is a schematic view of the color coding of the cable pairs in the suspension.
Figure 6:
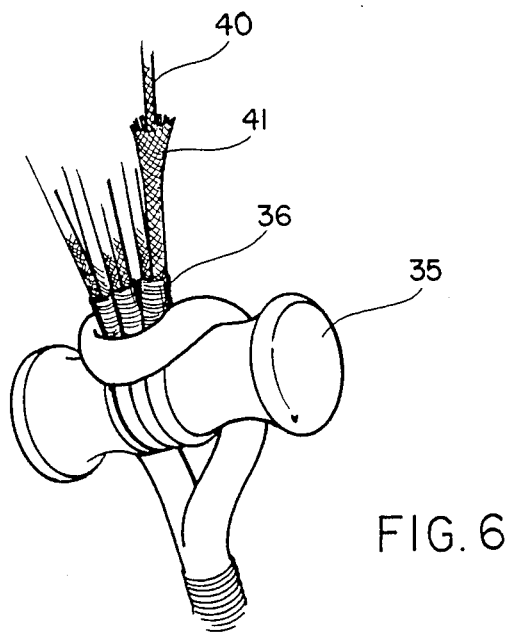
FIG. 6 is a fragmentary perspective view of the connection of the carriage suspension rope connected to the toggle of the non-conductive suspension cable.

Referring now to FIG. 5, the suspension arrangement of a typical balloon is shown schematically. In the arrangement shown in FIG. 5, three sets of suspension cables 20 are used to interface with 18 load cords 13. In other arrangements, 12 or 24 load cords 13 interface with the three sets of suspension cables 20. As is shown in FIG. 6, each set of suspension cables 20 comprises 3 cables, each of which is doubled over a toggle 35 to form 6 cable ends. Each cable 20 is wrapped with whipping cord 36 to tightly and securely bind the cables 20 to the toggle 35. The carriage suspension rope eye splices 26 are hooked over and carried by the toggles 35 in the manner shown in FIG. 6.

Suspension cable 20 is comprised of a core 40 of braided, continuous filament aramid fiber of the type sold under the trademark Kevlar. In the preferred embodiment disclosed for purposes of illustration here, the core 40 comprises DuPont Kevlar 29 aramid fiber. The core 40 is constructed of continuous filament fibers with two 1500 denier yarns per strand with an 8 strand construction. The core 40 is braided in a Samson XLS braid, which provides extra low stretch.

The core 40 is covered with a braided sheath 41 of polyester filament yarn to provide protection to the core 40 against abrasion and also against exposure to ultraviolet light. In the preferred embodiment disclosed herein, the sheath 41 is constructed of Duron polyester fiber manufactured by Allied Chemical. The construction is a "paralay" design with two 100 denier per strand with the sheath comprising 8 strands with a blue tracer strand. The cable 20 has a finish diameter of 3/16ths inch (0.5 cm).

Core 40 has a destruct point of 900° F. (482° C.) and the sheath 41 has a melting point of 492° F. (255° C.). An inadvertent blast from the burner 25 will then immediately destroy the sheath 41 in the area of flame contact and give an indication that the cable 20 must be inspected. The normally light yellow Kevlar does not molt but will char. Any visible damage to the Kevlar from heat of abrasion necessitates replacement of the cable 20. If the sheath 41 but not the core 40 is damaged, the damage can be repaired by covering it with 3/8ths (1 cm) heat-shrink tubing.

The arrangement of the high temperature core 40 and the low temperature sheath 41 prevents damage from being done to the core without a visible indication.

The result is a suspension cable with all of the advantages of stainless steel but yet electrically non-conductive. As a result, inadvertent contact with power lines upon take-off or landing is less likely to cause electrocution.

A electrically non-conductive suspension cable for a hot air balloon is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A suspension cable for connecting together the carriage support ropes and the envelope load cords or tapes of a hot air balloon in the area of the burner assembly, said suspension cable comprising a non-electrically conductive material having a destruct point sufficiently high to avoid damage from the accidental exposure to the flame of the burner and a tensile strength sufficient to support the balloon carriage and absent sufficient electrically conductive material to prevent conduction of electricity by the suspension cable, said cable further comprising a fiber core constructed from a first material, said core having a non-electrically conductive sheath constructed of a second material surrounding said core, which sheath will destruct if accidentally exposed to the flame of the burner in order to give an indication that the suspension cable should be inspected.

2. A suspension cable according to claim 1, wherein said suspension cable is braided.

3. A suspension cable according to claim 1, wherein said sheath is constructed of a material which provides abrasion and ultraviolet light protection to the fiber core.

4. A suspension cable according to claim 3, wherein said sheath comprises polyester material having a melting point of approximately 492° F. (255° C.).

5. A suspension cable according to claim 1 or 3, wherein said fiber core has a destruct point of 900 F. (482 C.).

6. A suspension cable according to claim 4, wherein said fiber core and said polyester material are both braided.

7. A suspension cable assembly for connecting together the carriage support ropes and the envelope load cords of a hot air balloon in the area of the burner assembly, said suspension cable assembly comprising:

(a) a non-electrically conductive material defining a suspension cable and having a destruct point sufficiently high to avoid damage from the accidental exposure to the flame of the burner and a tensile strength sufficient to support the balloon and absent sufficient electrically conductive material to prevent conduction of electricity by the suspension cable;

(b) an eye splice formed on one end of said suspension cable for mating interconnection with an eye splice on one end of the respective load cord to which the suspension cable is attached;

(c) a shackle intertwined between the eye splice of said suspension cable and the eye splice of said load cord to maintain a close connection between the two and to provide an enlarged bend radii to the material to prevent material breakage from sharp bending; and (d) wherein said non-conductive material comprises an aramid fiber core, and said suspension cable includes a non-electrically conductive sheath surrounding said core which will destruct if accidentally exposed to the flame of the burner in order to give an indication that the suspension cable should be inspected.

8. A suspension cable assembly according to claim 7, wherein said suspension cable is braided.

9. A suspension cable assembly according to claim 8, wherein said sheath is constructed of a material which provides abrasion and ultraviolet light protection to the aramid fiber core.

10. A suspension cable assembly according to claim 9, wherein said sheath comprises polyester material having a melting point of approximately 492 F. (255 C.).

11. A suspension cable assembly according to claim 7 or 10, wherein said aramid fiber core has a destruct point of 900 F. (482 C.).

12. A suspension cable assembly according to claim 10, wherein said aramid fiber core and said polyester material are both braided.

13. In a hot air balloon including a carriage and a burner assembly suspended from an envelope by means of load cords in the envelope connecting with suspension cables in the area of the burner, which are in turn connected with carriage ropes, the improvement which comprises said suspension cables comprising a non-electrically conductive material having a destruct point sufficiently high to avoid damage from the accidental exposure to the flame of the burner and a tensile strength sufficient to support the balloon and absent sufficient electrically conductive material to prevent conduction of electricity by the suspension cable, wherein said non-conductive material comprises an aramid fiber core, and said suspension cable includes a non-electrically conductive sheath surrounding said core which will destruct if accidentally exposed to the flame of the burner in order to give an indication that the suspension cable should be inspected.

14. A suspension cable according to claim 13, wherein said suspension cable is braided.

15. A suspension cable according to claim 13, wherein said sheath is constructed of a material which provides abrasion and ultraviolet light protection to the aramid fiber core.

16. A suspension cable according to claim 15, wherein said sheath comprises polyester material having a melting point of approximately 492° F. (255° C.).

17. A suspension cable according to claim 13 or 15, wherein said non-electrically conductive material has a destruct point of 900 F. (482 C.).

18. A suspension cable according to claim 16, wherein said aramid fiber core and said polyester material are both braided.

19. A suspension cable assembly for connecting together the carriage support ropes and the envelope load cords of a hot air balloon in the area of the burner assembly, said suspension cable assembly comprising:

(a) aramid fiber non-electrically conductive material defining a suspension cable and having a destruct point sufficiently high to avoid damage from the accidental exposure to the flame of the burner and a tensile strength sufficient to support the balloon and absent sufficient electrically conductive material to prevent conduction of electricity by the suspension cable;

(b) an eye splice formed on one end of said suspension cable for mating interconnection with an eye splice on one end of the respective load cord to which the suspension cable is attached; and (c) a shackle intertwined between the eye splice of said suspension cable and the eye splice of said load cord to maintain a close connection between the two and to provide an enlarged bend radii to the aramid fiber material to prevent material breakage from sharp bending.

20. A suspension cable for connecting together the carriage and the envelope load cords or tapes of a hot air balloon, said suspension cable comprising a non-electrically conductive material having a destruct point sufficiently high to avoid damage from the accidental exposure to the flame of the burner and a tensile strength sufficient to support the balloon carriage and absent sufficient electrically conductive material to prevent conduction of electricity by the suspension cable, wherein said non-conductive material comprises a fiber core, and said suspension cable includes a non-electrically conductive sheath surrounding said core which will destruct if accidentally exposed to the flame of the burner in order to give an indication that the suspension cable should be inspected.

21. A suspension cable according to claim 20, wherein said suspension cable is braided.

22. A suspension cable according to claim 20, wherein said sheath is constructed of a material which provides abrasion and ultraviolet light protection to the aramid fiber core.

23. A suspension cable according to claim 22, wherein said sheath comprises polyester material having a melting point of approximately 492° F. (255° C.).

24. A suspension cable according to claim 20 or 22, wherein said aramid fiber core has a destruct point of 900 F. (482 C.).

25. A suspension cable according to claim 23, wherein said aramid fiber core and said polyester material are both braided.

26. A suspension cable assembly for connecting together the carriage and the envelope load cords of a hot air balloon, said suspension cable assembly comprising:
 (a) a non-electrically conductive material defining a suspension cable and having a destruct point sufficiently high to avoid damage from the accidental exposure to the flame of the burner and a tensile strength sufficient to support the balloon and absent sufficient electrically conductive material to prevent conduction of electricity by the suspension cable;
 (b) an eye splice formed on one end of said suspension cable for mating interconnection with an eye splice on one end of the respective load cord to which the suspension cable is attached; and
 (c) a shackle intertwined between the eye splice of said suspension cable and the eye splice of said load cord to maintain a close connection between the two and to provide an enlarged bend radii to the material to prevent material breakage from sharp bending, wherein said non-conductive material comprises a core, and said suspension cable includes a non-electrically conductive sheath surrounding said core which will destruct if accidentally exposed to the flame of the burner in order to give an indication that the suspension cable should be inspected.

27. A suspension cable assembly according to claim 26, wherein said suspension cable is braided.

28. A suspension cable assembly according to claim 26, wherein said sheath is constructed of a material which provides abrasion and ultraviolet light protection to the fiber core.

29. A suspension cable assembly according to claim 28, wherein said sheath comprises polyester material having a melting point of approximately 492° F. (255° C.) and said core is constructed of aramid fiber.

30. A suspension cable assembly according to claim 26 or 29, wherein said aramid fiber non-electrically conductive material has a destruct point of 900° F. (482° C.).

31. A suspension cable assembly according to claim 29, wherein said aramid fiber core and said polyester material are both braided.

32. In a hot air balloon including a carriage suspended from an envelope by means of load cords or tapes, the improvement which comprises suspension cables interconnecting said load cords or tapes with said carriage and comprising a non-electrically conductive material having a destruct point sufficiently high to avoid damage from the accidental exposure to the flame of the burner and a tensile strength sufficient to support the balloon; wherein said non-conductive material comprises a core, and said suspension cable includes a non-electrically conductive sheath surrounding said core which will destruct if accidentally exposed to the flame of the burner in order to give an indication that the suspension cable should be inspected.

33. A suspension cable according to claim 32, wherein said suspension cable is braided.

34. A suspension cable according to claim 32, wherein said sheath is constructed of a material which provides abrasion and ultraviolet light protection to the core.

35. A suspension cable according to claim 34, wherein said sheath comprises a polyester material having a melting point of approximately 492° F. (255° C.).

36. A suspension cable according to claim 32 or 34, wherein said non-electrically conductive material comprises an aramid fiber core and has a destruct point of 900° F. (482° C.).

37. A suspension cable according to claim 35, wherein said aramid fiber core and said polyester material are both braided.

38. A suspension cable assembly for connecting together the carriage and the envelope load cords or tapes of a hot air balloon, said suspension cable assembly comprising:
 (a) aramid fiber non-electrically conductive material defining a suspension cable and having a destruct point sufficiently high to avoid damage from the accidental exposure to the flame of the burner and a tensile strength sufficient to support the ballon and absent sufficient electrically conductive material to prevent conduction of electricity by the suspension cable;
 (b) an eye splice formed on one end of said suspension cable for mating interconnection with an eye splice on one end of the respective load cord or tape to which the suspension cable is attached; and
 (c) a shackle intertwined between the eye splice of said suspension cable and the eye splice of said load cord or tape to maintain a close connection between the two and to provide an enlarged bend radii to the aramid fiber material to prevent material breakage from sharp bending.

39. In a hot air balloon including a carriage and a burner assembly suspended from an envelope by means of load cords or tapes in the envelope connecting with suspension cables in the area of the burner, which are in turn connected to the carriage, the improvement which comprises said suspension cables comprising aramid fiber non-electrically conductive material having a destruct point sufficiently high to avoid damage from the accidental exposure to the flame of the burner and absent sufficient electrically conductive material to prevent conduction of electricity by the suspension cable.

* * * * *

Disclaimer and Dedication 4,813,630.—*Sidney H. Conn*, Statesville, N. C. ELECTRICALLY NON-CONDUCTIVE SUSPENSION CABLES FOR HOT AIR BALLOONS. Patent dated Mar. 21, 1989. Disclaimer and Dedication filed June 18, 1990, by the inventor.

Hereby disclaims and dedicates to the Public claims 1 through 6, 13 through 18, 20 through 25, 32 through 37 and 39 of said patent.

[*Official Gazette September 25, 1990*]